Sept. 30, 1952 V. SCHWARZKOPF 2,612,180
WEIGH CAN DUMPING CONTROL
Filed March 8, 1950
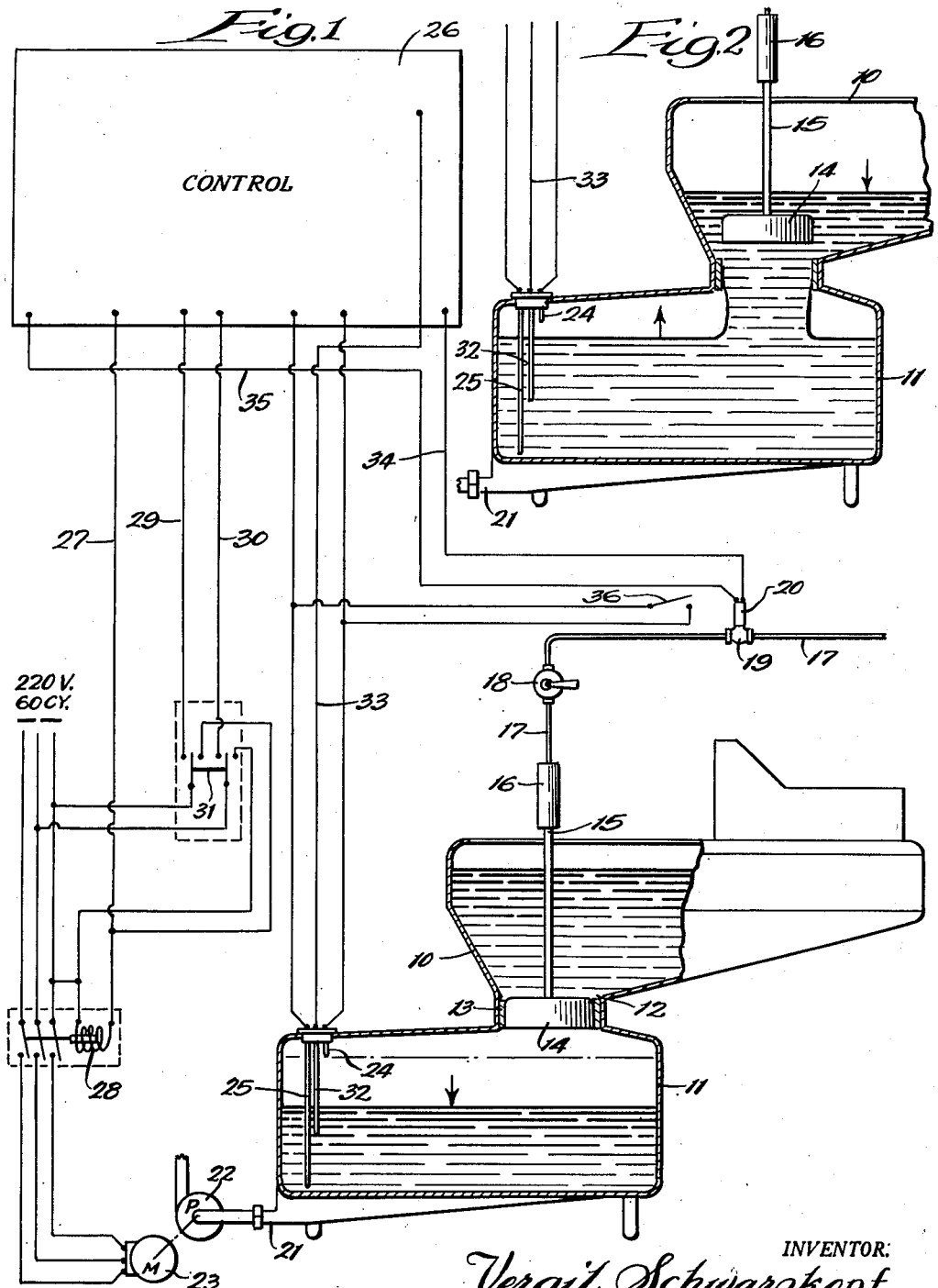
INVENTOR:
Vergil Schwarzkopf,
BY Dawson, Ormo, Booth and Spangenberg,
ATTORNEYS.

Patented Sept. 30, 1952

2,612,180

UNITED STATES PATENT OFFICE 2,612,180

WEIGH CAN DUMPING CONTROL

Vergil Schwarzkopf, La Grange, Ill., assignor to The Lathrop-Paulson Company, Chicago, Ill., a corporation of Illinois Application March 8, 1950, Serial No. 148,338

6 Claims. (Cl. 137—390)

1

This invention relates to a weigh can dumping control, and is particularly useful in the control of the flow of milk from a weigh can into a receiving tank.

It is now common to employ a weigh can equipped with an outlet communicating with a receiving tank, the outlet being controlled by an air-operated valve equipped with a handle which the operator moves from time to time to allow milk to flow from the weigh can into the receiving tank. Also in such structures, there is provided depending electrodes provided with electric circuits controlling the pump motor, the electrodes being spaced apart, one near the top of the tank and the other near the bottom, so that when the liquid level reaches the electrode at the top of the tank the pump motor is started, and when the liquid level reaches the bottom portion of the tank the pump motor is stopped.

A major difficulty arises in the operation of the above apparatus in that the operator will often open the valve controlling the outlet of the weigh can and release milk into the receiving tank when there is not sufficient space in the receiving tank to receive the incoming milk. As a result, there is an overflow of the milk from the receiving tank, with substantial loss.

An object of the present invention is to provide means for preventing the release of milk from the weigh can until there is sufficient room in the receiving tank to receive all of the milk in the weigh can. Yet another object is to provide control means which prevent the hand-operated valve controlling the dump valve of the weigh can from being effective, while at the same time automatically bringing about the dumping operation when the pump has removed sufficient milk from the receiving tank to lower the level thereof sufficiently to enable it to receive the contents of the weigh can. Other specific objects and advantages will appear as the specifications proceeds.

The invention is shown in an illustrative embodiment, in which:

Figure 1 is a side elevation of apparatus embodying the invention, a portion of the apparatus being shown in vertical section, and the wiring lay-out being shown diagrammatically; and Figure 2, a vertical sectional view showing the valve raised but the liquid level in the overflow tank below the point at which the pump is started into operation.

In the illustration given, 10 designates the weigh can and 11 the receiving tank. The weigh can 10 is provided with an outlet 12 having a valve ring 13 therein receiving the valve 14. A

2 valve stem 15 enters an air cylinder 16, to which air is supplied through the compressed-air line 17. The air line 17 is controlled by the hand-operated valve 18. This structure may be of any suitable type or construction. For example, a structure may be employed as shown in Rufus Patent No. 2,293,269.

Beyond the valve 18 is a second valve 19 controlled by a solenoid 20. The valve 19 is, in a sense, a master valve for the purpose of closing off the air line 17 when it is desired to render the hand-operated valve 18 inoperative, as will be more fully described later.

The receiving tank 11 is provided with a draw-off pipe 21 communicating with the intake of a pump 22. The pump 22 is operated by a motor 23 through direct drive means, or by the use of belt and pulleys, etc.

The receiving tank 11 is provided with electrically-operated means for starting the pump and for stopping the pump. Such means are of well-known construction and need not be described in detail. In the illustration given, there is an electrode 24 which terminates near the top of the tank 11 and which is effective for starting the motor, and there is a long electrode 25 which terminates near the bottom of the tank and which is effective for stopping the motor pump. To the electrodes are connected leads leading to a control box 26, with which wiring connections are provided for controlling the operation of the pump. In the illustration given, there is a lead 27 connected to a solenoid switch 28, and there is interposed between lines 29 and 30 a hand-operated switch 31 which may be swung to make contact with leads connected with the switch 28 so as to effect either a manual operation of the pump or automatic operation thereof. Since this structure is old and well known, a further detailed description is believed to be unnecessary.

I will now describe the mechanism which is employed for preventing the operator from drawing milk into the receiving tank before there is sufficient room in the tank to receive the contents of the weigh can. I provide an electrode 32 which terminates at a point between the electrodes 24 and 25. A lead 33 connects the electrode to the control box and thence, through electrical connections, a current flows from the control through the leads 34 and 35 to the solenoid 20. The solenoid may be of any suitable type, but is preferably of the type in which the valve is closed when the solenoid is energized and opened when the solenoid is de-energized.

Thus, when the liquid level is above the lower end of electrode 32, the circuit is closed and the solenoid energized to close the air line 17, while when the liquid level drops below electrode 32, the solenoid is de-energized and the valve is opened.

Instead of employing air means for operating the valve 14, it will be understood that the power may be electrical power or any other suitable form of power.

If desired, the pump operation may be controlled through the use of a manually-operable switch 36, as illustrated.

Operation

In the operation of the apparatus illustrated, milk is dumped into the receiving tank 11 in the usual way, and when the level reaches the electrodes 24 the circuit of the motor pump is closed and the pump starts into operation to withdraw milk from tank 11 through outlet 21. In the foregoing operation, the operator opens the hand valve 18 to effect the raising of the valve 14. After the valve 14 has again been seated and the weigh can has received a new load of milk, the operator may again open the valve 18. If, however, the liquid level within the receiving tank 11 is above the electrode 32, the circuit with the solenoid 20 is completed and the valve 19 is closed so that no air passes through pipe 17 to the cylinder 16. No milk, therefore, flows from the weigh can even though the operator has set the handle 18 for the opening of the valve. However, as the milk is withdrawn from tank 11 by the pump 22, the level thereof drops and soon falls below the electrode 32, thus interrupting the circuit and de-energizing the solenoid 20. Valve 19 is therefore opened and air flows through the conduit 17 and into the fluid-pressure operated cylinder 16, which raises the valve stem 15. The above operations will be repeated as milk flows into and out of the receiving tank 11.

In the illustration given in Figure 1, the valve 14 is in closed position and the pump is in operation, the liquid level being between the lower ends of elements 24 and 32. In the operation illustrated in Figure 2, the liquid level is rising but the pump has not yet been set into operation. As the liquid level rises between the lower ends of elements 32 and 24, the pump remains idle and will not start until the milk level reaches the lower end of the element 24. However, since the milk level is above the lower end of 32, the solenoid member 24 keeps the valve 19 closed so that valve 18 is inoperative. This prevents the operator from opening valve 19 to discharge milk from tank 10 through valve 14 and thus causing an overflow of tank 11. When this happens, the operator must start the pump by manually operating switch 36. As soon as the pump reduces the liquid level below point 32, then valve 19 opens and air is delivered to cylinder 16 so as to open valve 14.

While in the drawing I have shown the electrodes communicating with a control box through lead lines, since such structures are well known in the art it will be understood that the lead lines forming the circuit for the electrode 32 may lead directly to the solenoid 20 and therefore not pass through any other control structure.

While in the foregoing specification I have shown certain structures in detail for the purpose of illustrating a specific embodiment of the invention, it will be understood that the embodiments may be of many different forms and construction and may vary in detail without departing from the spirit of my invention.

I claim:

1. In a weigh can having an outlet communicating with a pump-equipped receiving tank and a power-actuated dump valve controlling said outlet, a hand-operated valve for releasing power for opening said dump valve, said receiving tank being provided with electrically-operated means having depending electrodes of different elevations adapted to be actuated by the liquid level, for starting and stopping the pump, a third electrode depending within said tank at an elevation between said first-mentioned electrodes, a circuit for said third electrode, adapted to be closed by engagement thereof with liquid in said tank, a solenoid in said circuit, and means actuated by said solenoid for shutting off the power for said power-actuated dump valve.

2. In a weigh can having an outlet communicating with a pump-equipped receiving tank and a power-actuated dump valve controlling said outlet, a hand-operated valve for releasing power for opening said dump valve, said receiving tank being provided with electrically-operated means having depending electrodes of different elevations adapted to be actuated by the liquid level for starting and stopping the pump, a third electrode depending within said tank at an elevation between said first-mentioned electrodes, a circuit for said third electrode, adapted to be closed by engagement thereof with liquid in said tank, a solenoid in said circuit, and means actuated by said solenoid for shutting off the power for said power-actuated dump valve, said solenoid being rendered inoperative by the dropping of the liquid level below said third electrode.

3. In a weigh can having an outlet communicating with a receiving tank and a power-actuated dump valve controlling said outlet, a hand-operated valve for releasing power for opening said dump valve, an electrode depending within said tank at an intermediate elevation therein, a solenoid, means actuated by said solenoid for shutting off the power and rendering said hand-operated valve ineffective, and means associated with said electrode to form a circuit therewith and with said solenoid, said circuit being closed by the engagement of liquid in said tank with said means and said electrode.

4. In a weigh can having an outlet communicating with a receiving tank, a valve controlling said outlet, a fluid-operated motor for actuating said valve to open and closed positions, a hand-operated valve for controlling the flow of fluid to said motor, a second valve for controlling the flow of fluid to said hand-operated valve and motor, a solenoid controlling said second-mentioned valve, an electrode depending within said receiving tank, and means associated with said electrode and providing a circuit therewith, and including said solenoid, for closing said second valve when liquid in the tank is in contact with said electrode.

5. In a weigh can having an outlet communicating with a receiving tank, a valve controlling said outlet, a fluid-operated motor for actuating said valve to open and closed positions, a hand-operated valve for controlling the flow of fluid to said motor, a second valve for controlling the flow of fluid to said hand-operated valve and motor, a solenoid controlling said second-mentioned valve, an electrode depending within said receiving tank, and means associated with said electrode and providing a circuit therewith, and including said solenoid, for closing said second valve when liquid in the tank is in contact with said electrode, and for opening said second valve when the liquid level within said tank drops below said electrode.

6. In a weigh can having an outlet communicating with a pump-equipped receiving tank, a dump valve controlling said outlet, a fluid-pressure operated motor for moving said valve to open and closed positions, a hand-operated valve for controlling the flow of fluid to said motor, said receiving tank being provided with electrically-operated means having depending electrodes of different lengths adapted to be actuated by the liquid level within said tank for starting and stopping the pump, a third electrode depending within said tank and terminating at a point between said first-mentioned electrodes, a circuit for said third electrode adapted to be closed by the engagement of liquid in said tank therewith, a solenoid in said circuit, and a valve actuated by the solenoid for controlling the flow of pressure fluid to said hand-operated valve and to said motor.

VERGIL SCHWARZKOPF.

No references cited.